United States Patent

Tran

Patent Number: 5,606,500
Date of Patent: Feb. 25, 1997

[54] STATE MACHINE FOR INTEGRATED ASE SENSORS

[75] Inventor: My Tran, Albuquerque, N.M.

[73] Assignee: Honeywell Inc., Minneapolis, Minn.

[21] Appl. No.: 977,376

[22] Filed: Nov. 17, 1992

[51] Int. Cl.⁶ .................. G01S 7/36; G01S 7/38
[52] U.S. Cl. ............. 364/423.098; 342/13; 342/16; 434/2
[58] Field of Search ............ 364/423, 424.01, 364/424.06; 342/13, 14, 16, 20, 169; 434/2; 345/172, 173; 340/973, 984

[56] References Cited

U.S. PATENT DOCUMENTS

| | | | |
|---|---|---|---|
| 4,424,038 | 1/1984 | Tingleff et al. | 434/2 |
| 4,658,359 | 4/1987 | Palatucci et al. | 364/424.06 |
| 4,760,525 | 7/1988 | Webb | 364/200 |
| 4,845,495 | 7/1989 | Bollard et al. | 364/424.06 |
| 4,959,015 | 9/1990 | Rasinski et al. | 434/2 |
| 5,017,141 | 5/1991 | Relf et al. | 434/29 |
| 5,017,929 | 5/1991 | Tsuda | 342/427 |
| 5,111,400 | 5/1992 | Yoder | 364/424.01 |
| 5,122,801 | 6/1992 | Hughes | 342/13 |
| 5,287,110 | 2/1994 | Tran | 342/13 |
| 5,406,286 | 4/1995 | Tran | 342/13 |
| 5,410,313 | 4/1995 | Tran | 342/13 |

*Primary Examiner*—Gary Chin
*Assistant Examiner*—Tyrone V. Walker
*Attorney, Agent, or Firm*—Kenneth J. Johnson

[57] ABSTRACT

An integrated aircraft survivability equipment state machine. Aircraft survivability sensors provide aircraft survivability states that are routed to a finite state machine. Data processing, data generation, data representation, queueing tactical information and initiation of aircraft survivability counter measures are controlled by the state oriented approach. Systems state can be altered based on mission defined variables. Counter measures can be initiated based on correlated threat data and other functions such as failure recording and threat database generation functions. All individual aircraft survivability subsystems are integrated and controlled by the state machine. The state machine manages the ASE subsystem power as far as built-in testing and controls for the integrated ASE system. Overall threat data presentation is controlled and driven by the system state.

11 Claims, 6 Drawing Sheets

STATE MACHINE FOR INTEGRATED ASE SENSORS

UNITED STATES GOVERNMENT RIGHTS

The United States Government has acquired certain rights in this invention through government Contract No. DAA B07-87-C-H041 awarded by the Department of the Army.

BACKGROUND OF THE INVENTION

1. Field of the Invention

The present invention relates to the field of aircraft survivability and, in particular, to an integrated system of aircraft survivability equipment operated as a state machine.

2. Discussion of the Prior Art

In the prior art, individual aircraft survivability equipment (ASE) sensors are used as stand-alone systems. The use of such systems in a stand-alone manner results in high pilot workloads. Further, in such systems only a limited amount of threat data is presented to the pilot. Data provided by various ASE subsystems such as pulsed radar jammers, CW radar jammers and missile approach detectors have previously not been used to provide a comprehensive and coherent picture of the threat environment. Thus prior art systems often do not present adequate data in a readily understood format to enable the pilot to quickly and completely assess a given threat environment.

It is therefore the motive of the invention to provide an integrated ASE environment that reduces pilot workload while at the same time enhancing aircraft survivability.

SUMMARY OF THE INVENTION

In contrast to the prior art, the invention, for the first time, integrates all ASE sensors into an integrated ASE system which operates as a finite state machine. In accordance with the principles of this invention data processing, data generation, data representation, and initiation of counter measures are state driven. The present invention exhibits several advantages over recent known ASE systems. In one aspect, in contrast to the prior art, the present invention provides a more complete and coherent presentation of threat situations and increases overall system robustness by implementing across-sensor redundancy management.

The present invention further provides an apparatus and method for automatically altering system state based on mission defined variables. Further, the present invention provides a method of initiating counter measures based on correlated threat data and new utility functions such as failure recording and threat data base generation. Accordingly, the present invention reduces pilot workload, increases aircraft survivability, increases mission reliability, improves threat situation assessment and improves mission effectiveness.

One principle objective of this invention is to fully integrate all individual ASE subsystems into an integrated ASE system. The integrated system of the invention operates as a state machine. The system controls the power to all of the ASE subsystems, performs Built-In Testing (BIT) and many of the control functions required for an integrated system. At any given time, the integrated ASE system may be placed in a finite state which determines overall threat data presentation, capability data processing for active threat data base generation, system fault and other conditions. The invention also provides functional backup for the Radar Warning Receiver, queueing jammers and automatic initiation of countermeasures.

Other objects, features, and advantages of the invention will be apparent from the Description of the Preferred Embodiment, Claims and Drawings herein wherein like elements have like reference characters.

DESCRIPTION OF THE PREFERRED EMBODIMENT

Figure 1:
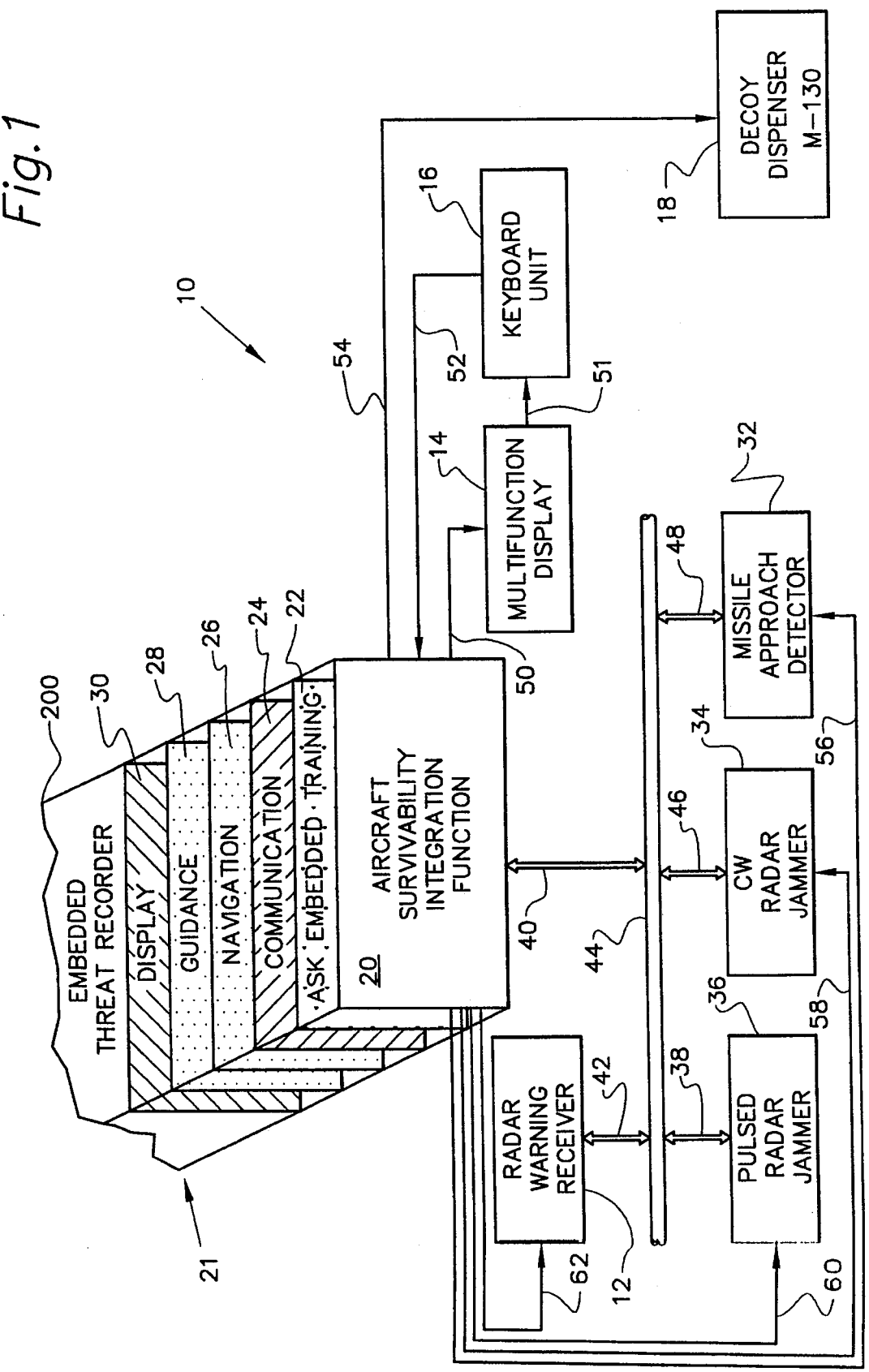
FIG. 1 shows a high level system diagram of one embodiment of the aircraft survivability integration equipment system as employed by the invention.

Now referring to FIG. 1, a high level system diagram of one embodiment of the aircraft survivability integration equipment system 10 as employed by the invention is shown. Aircraft survivability system 10 includes aircraft survivability integration functions 21, a multifunction display 14, a keyboard unit 16, a continuous wave (CW) radar jammer 34, a missile approach detector 32, a pulsed radar jammer 36, a radar warning receiver 12 and a decoy dispenser 18. The aircraft survivability integration functions 21 further include an aircraft survivability integration function 20, an aircraft survivability equipment embedded training apparatus 22, communication apparatus 24, navigation apparatus 26, guidance apparatus 28, display apparatus 30 and an embedded threat data recorder 200. The radar warning receiver 12, pulsed radar jammer 36, CW radar jammer 34, missile approach detector 32, multifunctional display 14, keyboard unit 16 and decoy dispenser 18 are standard units. The radar warning receiver 12, pulsed radar jammer 36, CW radar jammer 34 and missile approach detector 32 all communicate with each other and the aircraft survivability integration functions 21 through a data bus 44. The data bus 44 may advantageously be a MIL standard 1553 data bus or equivalent. In one example of the invention, the radar warning receiver (RWR) 12 communicates with the data bus through communication lines 42, the pulsed radar jammer 36 communicates with the data bus through communication lines 38, and the continuous wave (CW) radar jammer 34 communicates to the data bus by communication lines 48. In this way, the sensors in the system which comprise the radar warning receiver 12, pulsed radar jammer 36, CW radar jammer 34 and missile approach detector 32 can receive and transmit data to the aircraft survivability integration functions 21. In addition, the aircraft survivability integration functions 21 may be hardwired to the plurality of sensors. This introduction of hardwired lines to the individual sensors provides a redundancy feature in the system which guards against failure of the data bus 44. For example, the radar warning receiver may be wired by lines 62 into the aircraft survivability integration function 20, the pulsed radar jammer by lines 60, the CW radar jammer by lines 58 and the missile approach detector by lines 56. Hard wire and bus interfaces are typically provided with such ASE devices as are conventionally available.

The multifunction display 14 is controlled by the display apparatus 30 and is wired to the display apparatus 30 in aircraft survivability integration function 20 by lines 50. The multifunction display 14 also interfaces with the keyboard unit 16, which may be a standard keyboard unit, by lines 51. The keyboard unit 16 is also wired into the communication apparatus 24 by lines 52. Control lines 54 are connected from the ASE integrated functions 21 to the decoy dispenser 18.

Figure 2:
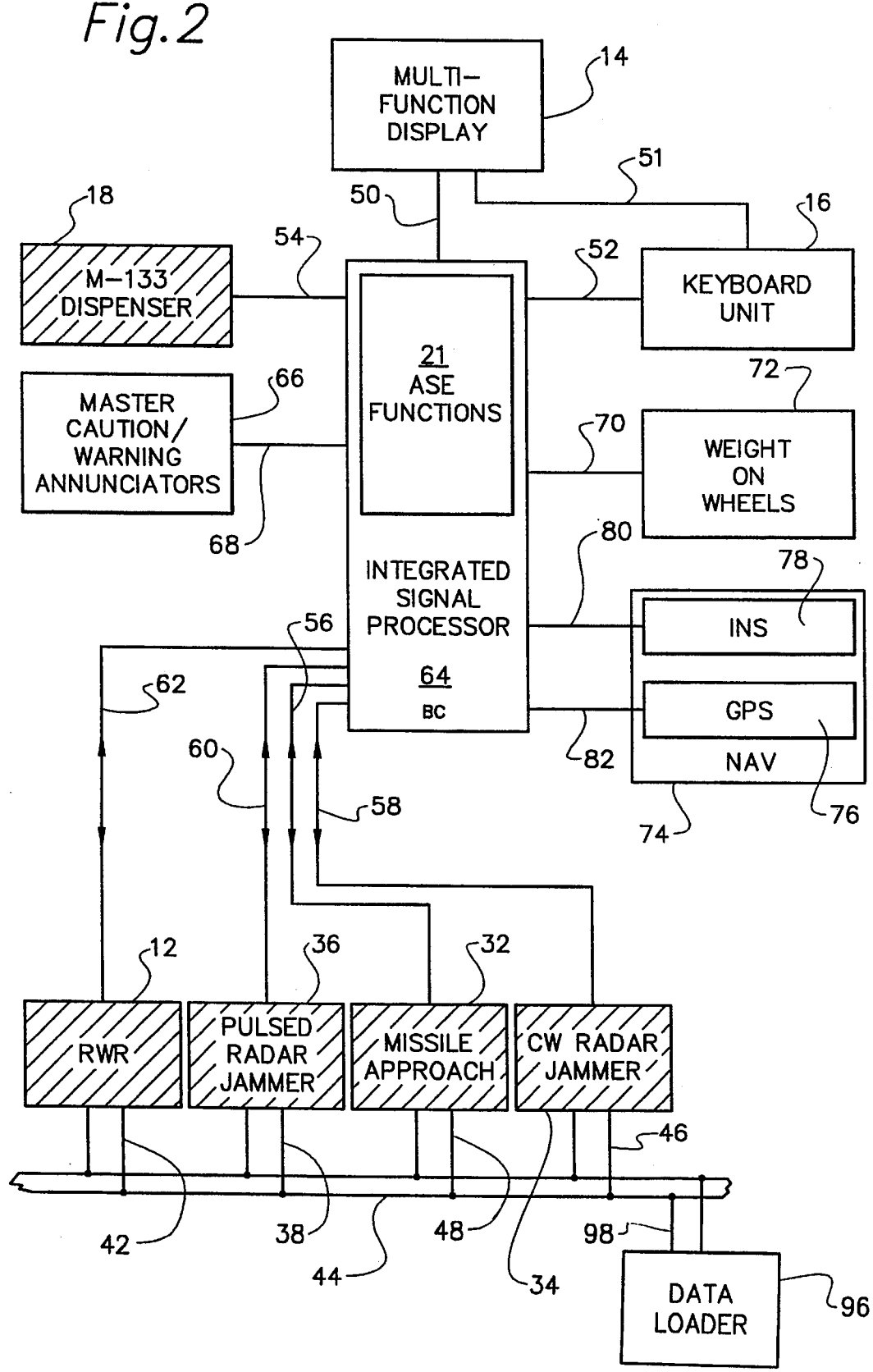
FIG. 2 shows a more detailed block diagram of the aircraft survivability equipment integration system 10 which is integrated into an aircraft survivability equipment/avionics control system (ASE/ACS).

Now referring to FIG. 2, a more detailed block diagram of the aircraft survivability equipment integration system is shown as integrated into an aircraft survivability equipment/ avionics control system (ASE/ACS). The aircraft survivability equipment/avionics control system is used to integrate control and display of an ASE suite of devices such as the radar warning receiver and jammers as well as selected military communication and navigation systems. Those skilled in the art will understand that the configuration shown in the block diagram of FIG. 2 is one example and does not so limit the invention. In the system shown in FIG. 2, the aircraft survivability integration functions 21 is embedded in an integrated signal processor 64. The integrated signal processor 64 may advantageously comprise a microprocessor, digital signal processor or an equivalent device. Also connected to the integrated signal processor 64 is a master caution/warning annunciator 66 which is connected to the integrated signal processor 64 by line 68, a weight on wheels sensor 72 which is connected by line 70, and navigation systems 74 which are connected by lines 80 and 82. The navigation equipment advantageously includes an inertial navigation system (INS) 78 and a global positioning system (GPS) 76. A data loader 96 is connected via lines 98 to bus 44. The data loader 96 is a conventional data loader and may be used to input flight information, databases and other parameters into the signal processor 64 prior to an aircraft embarking on a particular flight plan. The other components are as shown in FIG. 1 and operate similarly. Those skilled in the art will recognize that the ASE equipment including the radar warning receiver, jammers and missile approach detector are well known standard units.

The weight on wheels sensor 72 is a known sensor which communicates with the signal processor 64 and provides an enable signal line 70 which enables certain built-in test functions to be performed when the aircraft is on the ground. These built-in test functions may be a part of the radar warning receiver 12, the pulsed radar jammer 36, the missile approach detector 32 and the continuous wave radar jammer 34.

The integrated signal processor 64 also serves as a bus controller using well known control signals. The four ASE subsystems, RWR 12, pulsed radar jammer 36, missile approach detector 32 and CW radar jammer 34 may be advantageously configured as remote terminals.

The ASE/ACS system provides a fail active state with regard to the ASE suite. If, for example, the integrated signal processor 64 should fail, or power is removed from the unit, the ASE subsystems may assume their most active states. The ability to fire flares and chaff is not impaired by a data bus failure in this redundant configuration. In order to insure this, flare and chaff fire switches are wired directly into the decoy dispenser 18 and are not controlled by the ASE/ACS in the event of a data bus failure. In the alternative, the decoy dispenser 18 may be fired automatically through the aircraft survivability integration functions 21 when an appropriate signal is received from any one or more of the subsystem sensors, such as the radar warning receiver.

Figure 3:
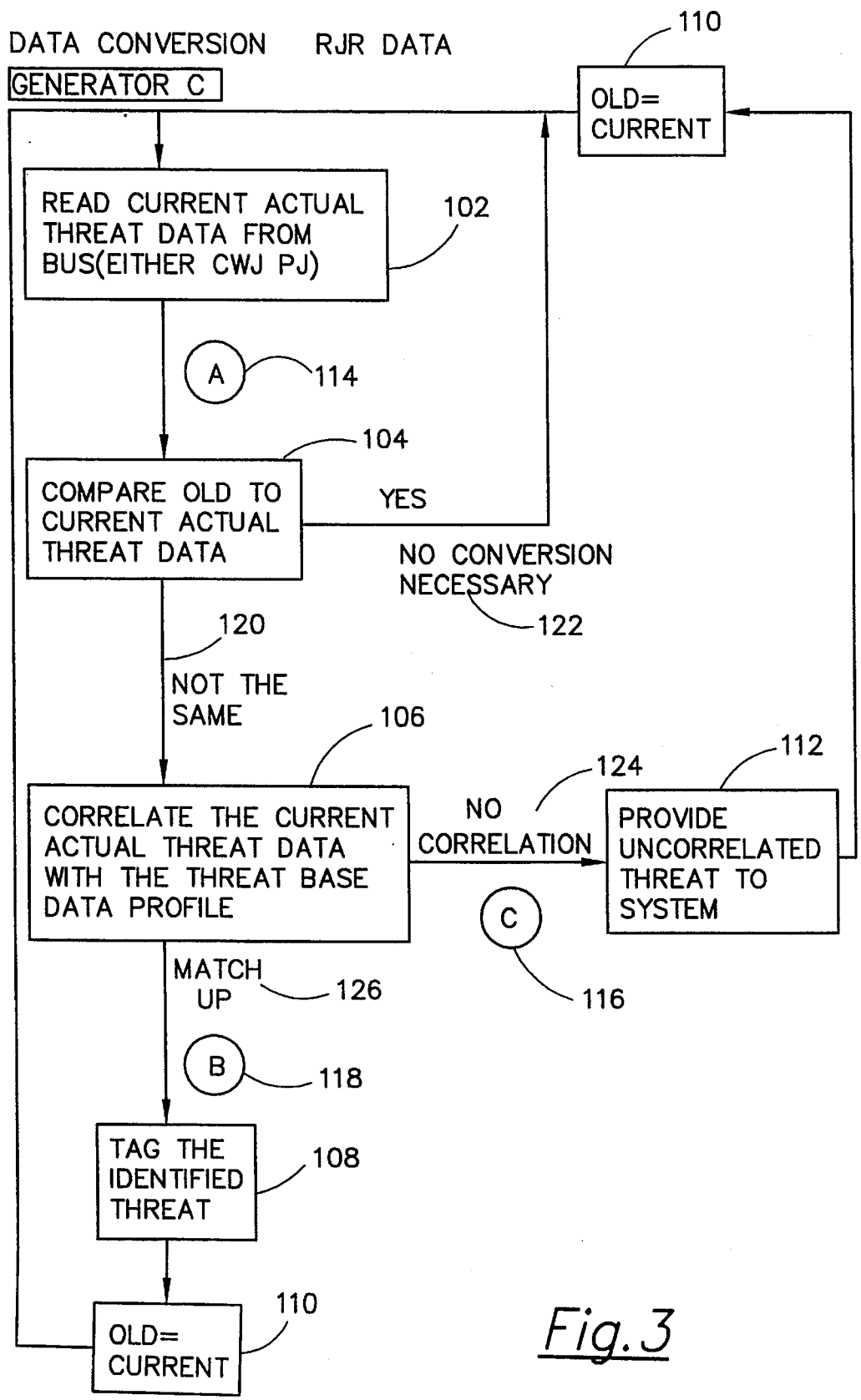
FIG. 3 shows a method of the invention that is used to convert the current actual threat data, that is sent to the system bus from either the continuous wave radar jammer or the pulsed radar jammer, to either an un-correlated threat or an identified threat.

Now referring to FIG. 3 which shows the method of the invention used to convert current actual threat data from the system data bus from either the continuous wave radar jammer or the pulsed radar jammer to either an un-correlated threat or an identified threat. The threat data base is composed of a number of sub-elements and parameters. A threat data base may be input into the system and stored in memory by any well-known means. The threat data base advantageously contains threat parameters including threat types which include, in one preferred embodiment of the invention, a missile, anti-aircraft gunfire, a fighter, or other threats identified by the aircraft. Each threat type has an associated set of parameters which, in one preferred embodiment of the invention, include frequency of the threat signal, amplitude of the threat signal, pulsed repetition frequency, pulsed repetition interval, angle of arrival, and operational mode of the threat. Those skilled in the art will recognize that other parameters may be used in the method of the invention. Those skilled in the art will recognize that either all the parameters may be included in the threat data base or just a few. The threat data base comprises a profile of known threats that may be encountered by the aircraft.

FIG. 3 shows the processing of data from a current actual threat as read from the jammer radars. The threat data is provided on the data bus 44 as shown in FIGS. 1 and 2. The process of the invention starts at step 102 wherein the current actual threat data from the data bus is read. This data is also available directly to the system processor 64 from the hardwire connections 58, 60 and from the radar jammers 34, 36. Those skilled in the art will recognize that the bus method of communication provides more robust threats. The process flows to step 104 where previously received old threat data is compared to just received current actual threat data. Step 104 parametrically correlates the old detected threat and the current detected threat. The correlation of different threat data occurs in different time slices. The old threat data occurred at the last sample period as indicated in step 110. The comparison of the various threat data parameters can occur either through known accepted methods such as boolean comparisons or threshold comparisons which compare an upper bound to a lower bound of the parameters, or a comparison of whether or not the parameters are within a window of parameter values. Alternate methods of comparison understood by those skilled in the art may be used such as fuzzy logic-based comparisons. The process flows to step 106 if the system is in a state that indicates the old and the current actual threat data is not the same. At step 106 the process correlates the current actual threat data with threat profiles from the threat data base. In one preferred embodiment of the invention, the current actual threat is compared against each element of the threat data base using the comparison methods used in step 104. If the threats correlate and match up as indicated by state 126, the process flows to step 108 where the identified threat is tagged. The process then flows to step 110 to set the old actual threat data to equal the current actual threat data. The process then returns to step 114.

Figure 5:
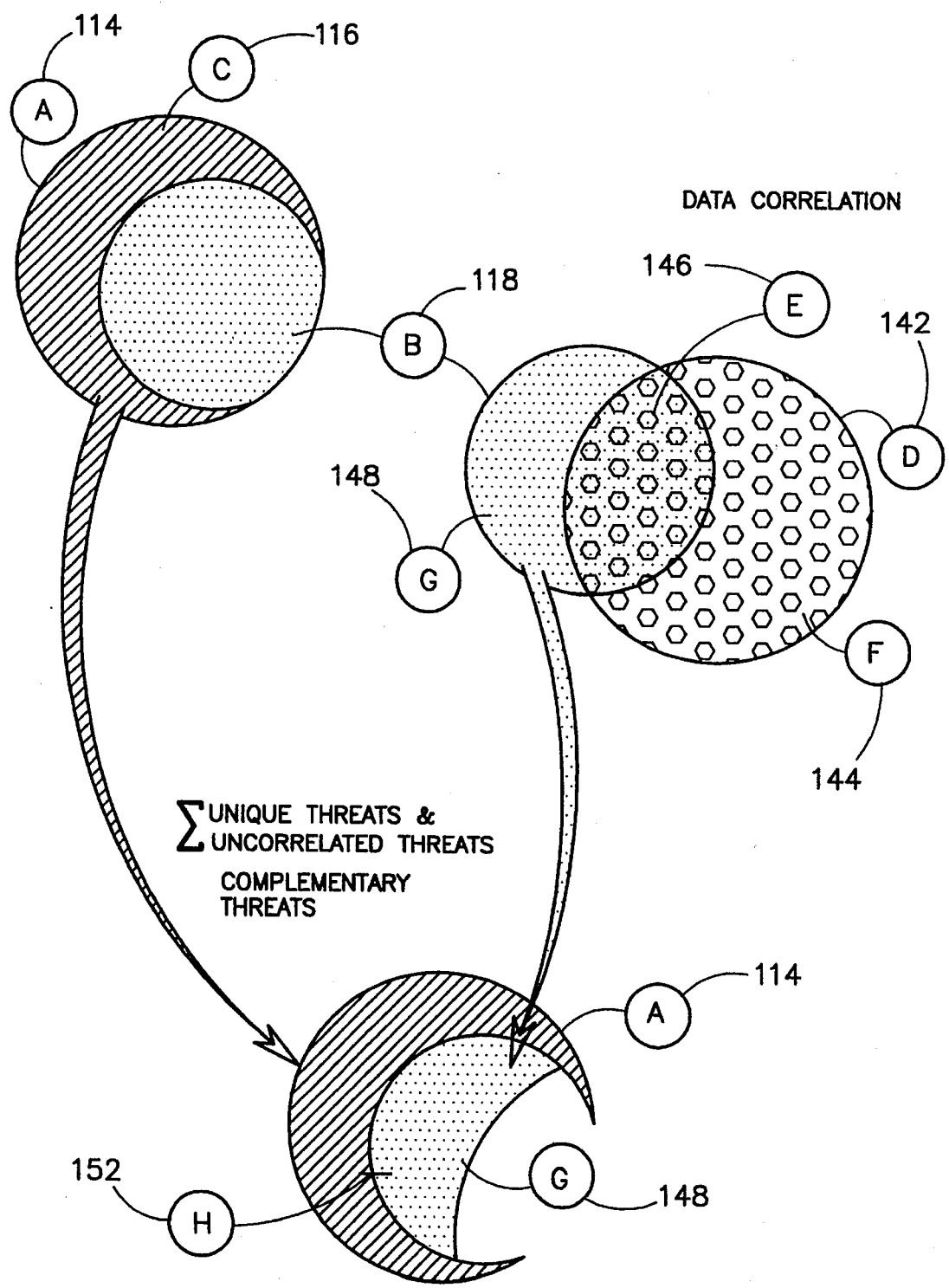
FIG. 5 shows a data flow diagram showing the various data sets of the invention in a Venn diagram fashion.

The processor creates different sets of data which are correlated as shown in FIG. 5 which is described in detail below. At step 102, the process takes data from one of the radar jammers which is designated as data set A 114. In step 106, a data set labeled C 116 is generated which represents an un-correlated current actual jammer threat data. This data is presented to process step 112 to provide un-correlated threat data to any system using the method of the invention. The process then flows to step 110 which sets the old threat data to the current threat data. Next, the process returns to step 102. The process step 106 generates a data set called B 118 which is the matched-up correlated current actual jammer threat data. If in process step 104 the comparison to check old threat data against current threat data results in the old and the current being the same, then the process flows to step 102 to read the next current actual threat data from the bus or from the hardwired system.

Figure 4:
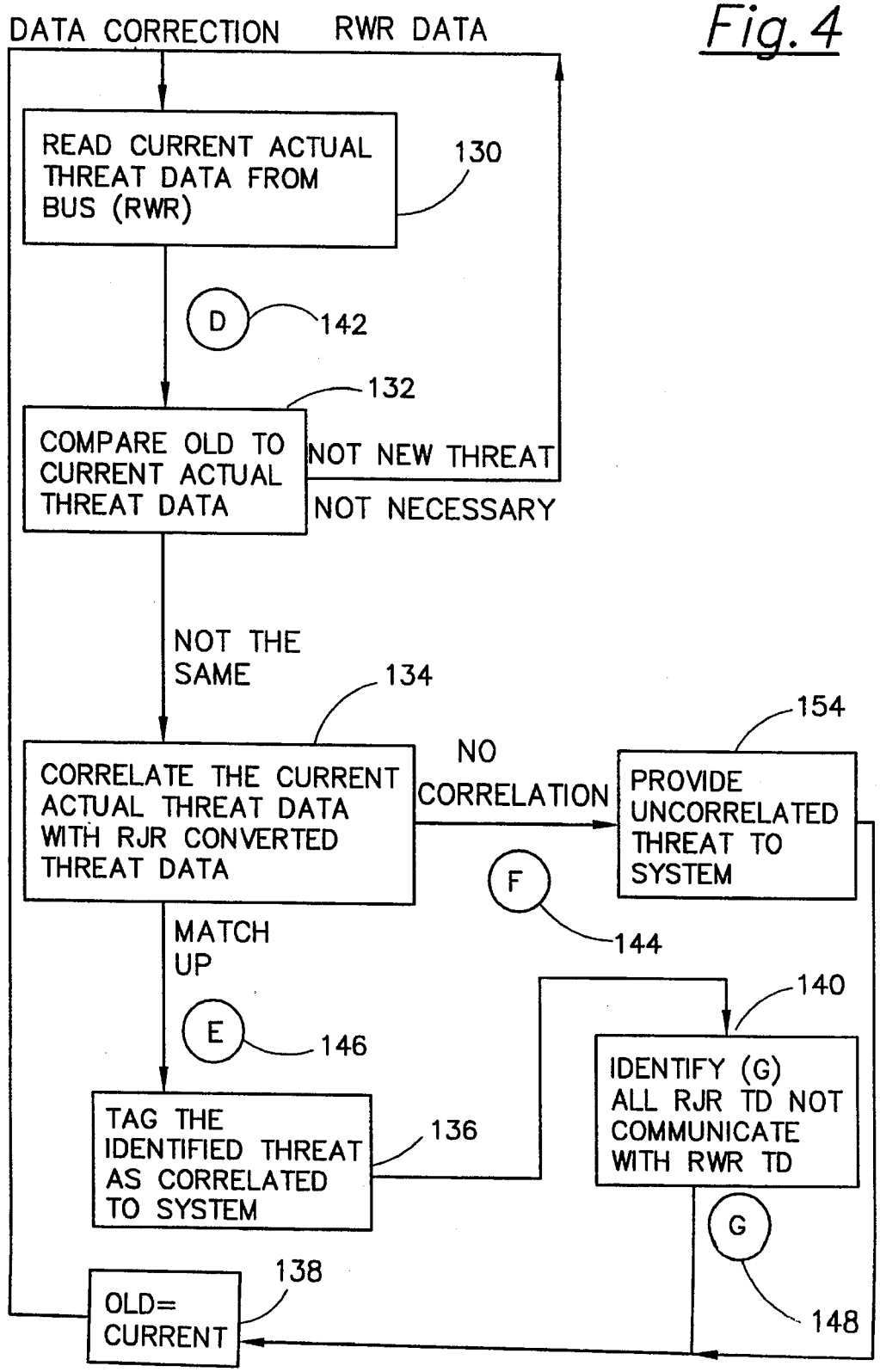
FIG. 4 shows one method of the invention used to perform data correlation on radar warning receiver data.

Referring now to FIG. 4, the method of the invention used to perform data correlation on radar warning receiver data is shown. The process starts at step 130 where the current actual threat data from the radar warning receiver is read from the data bus. Process step 130 generates data set D. Data set D is then used by process step 132 to compare the current actual threat data with old threat data from the radar warning receiver. If the two threats are identical (i.e. the old and the current in step 132), the process returns to step 130 to read another actual threat. Step 130 reads in all available threats from the radar warning receiver. The set of all possible threats is known as a threat set. In step 132, the old threat set is compared against a current actual threat set data. If the current actual threat set data is not a new threat set, then the process flows to step 130 to scan another set of threats. In step 132, if there is a new threat, the process flows to step 134 to correlate the current actual threat set with the correlated current actual jammer threat data which is generated in FIG. 3. The correlated current actual jammer threat data is indicated by set B 118. If the converted threat data set B 118 correlates with the current actual threat data set from the radar warning receiver, then the process flows to 136 to tag the identified threat set as a correlated new threat E 146 to the system using the method of the invention. The process then flows to step 140 where the process identifies a set G 148 which is all correlated radar jamming receiver threat data A 114 that is not common with the radar warning receiver threat data D 142. The process then flows to step 138 to set the old threat data set as the current threat data set for the next comparison and the next time cycle. The process then flows to step 130 to read the next current actual threat data set from the bus.

In step 134 if there is no correlation between the current actual threat data set of the radar warning receiver with the radar jamming receiver correlated threat data set, the process flows to step 154, generates an un-correlated threat set F 144, and provides the un-correlated threat set to the system using the method of the invention.

As in the case of the jammer data, when implementing the method of the invention to convert the current actual threat data set from the radar warning receiver B 142 to either a correlated or uncorrelated threat, the process creates various other data sets. Data set D 142 is the current active radar warning receiver threat data set from the bus. Data set E 146 is the correlated new threat data created by the correlation between current actual radar warning receiver threat data D 142 and the radar jamming receiver correlated threat data B 118. Data set F 144 is the un-correlated data. Data set G is all correlated radar jamming received threat data which is not common with the radar warning receiver threat data 148.

Now referring to FIG. 5, a data flow diagram showing the various data sets of the invention in a Venn diagram fashion is shown. Data set A 114 is the current actual jammer threat data. Data set B 118 is the correlated current actual jammer threat data or the converted set data. Data set C 116 is the un-correlated actual jammer threat data. Data set D 142 is current actual radar warning receiver threat data. Data set E 146 is the common current threat data between jammers and radar warning receiver. Data set F 144 is the un-correlated radar warning receiver threat data. Data set G 148 is the correlated radar jamming receiver threat data which is not common with the radar warning receiver threat data. Data set G is used subsequently to generate a complementary threat set H 152. Data set H 152 is the complementary threat data set which represents the summation of data sets C and G.

The two basic processes shown in FIG. 3 and FIG. 4 are joined in this data flow diagram of FIG. 5. Two basic data sets include the data from the radar jamming receivers which is data set A 114, and the radar warning receiver which is data set D 142. The process of FIG. 3 generates the data set B 118 which represents all correlated current actual jammer threat data sets. This is used by both processes shown in FIG. 3 and FIG. 4 to create a complementary threat. The data set B 118 is subtracted from data set A 114 to generate data set C 116 which is the uncorrelated current actual jammer threat data. Data set B 118 is also used along with the data set D 142 (current actual radar warning receiver threat data) to generate the intersection of the two data sets E 146. The data set E 146 is the common current threat data. The common current threat data is then subtracted from data set B 118 to generate a new data set G 148. Data set G 148 represents the radar jamming receiver threat data that is not common with the radar warning receiver threat data. That is, data set G 148 represents correlated data from threats which are detected by the jammers, but not the radar warning receiver. Data set G 148 and data set C 116 are combined to create data set H which is called the complementary threat data. The complementary threat data set H comprises threats that are complementary to the already identified threats which have been identified by the radar warning receiver.

From the integration of the Radar Warning Receiver, Pulsed Radar Jammer, CW Radar Jammer, Missile Approach Detector, and decoy dispenser, the ASE subsystems coherently operate as a single electronics warfare (EW) system. Various data blending techniques provide the following threat data: complementary data, backup RWR data for different failure modes, threat data jamming status and a threat data base for real time presentation and off-line analysis.

An integrated ASE system provides the capability to perform automatic system and/or reconfiguration management. System modes as well as process states, can change based on time, altitude and position.

In a state machine, the most needed subsystem designate the "primary" subsystem and the remaining subsystems are designated "secondary" subsystems.

In one example embodiment of the invention a system may include the following:

Radar Warning Receiver=Primary subsystem

Pulsed Radar Jammer=Secondary subsystem

CW Radar Jammer=Secondary subsystem

Missile Approach Detector=Secondary subsystem

There are three system states defined for the integrated ASE system: "Initial", "Primary", and "Secondary". These are viewed as "super" system states because each state contains a set of substates.

For instance, in the "primary" and "secondary" states, a substate is defined based on the combination of the mode states of the subsystems.

Figure 6:
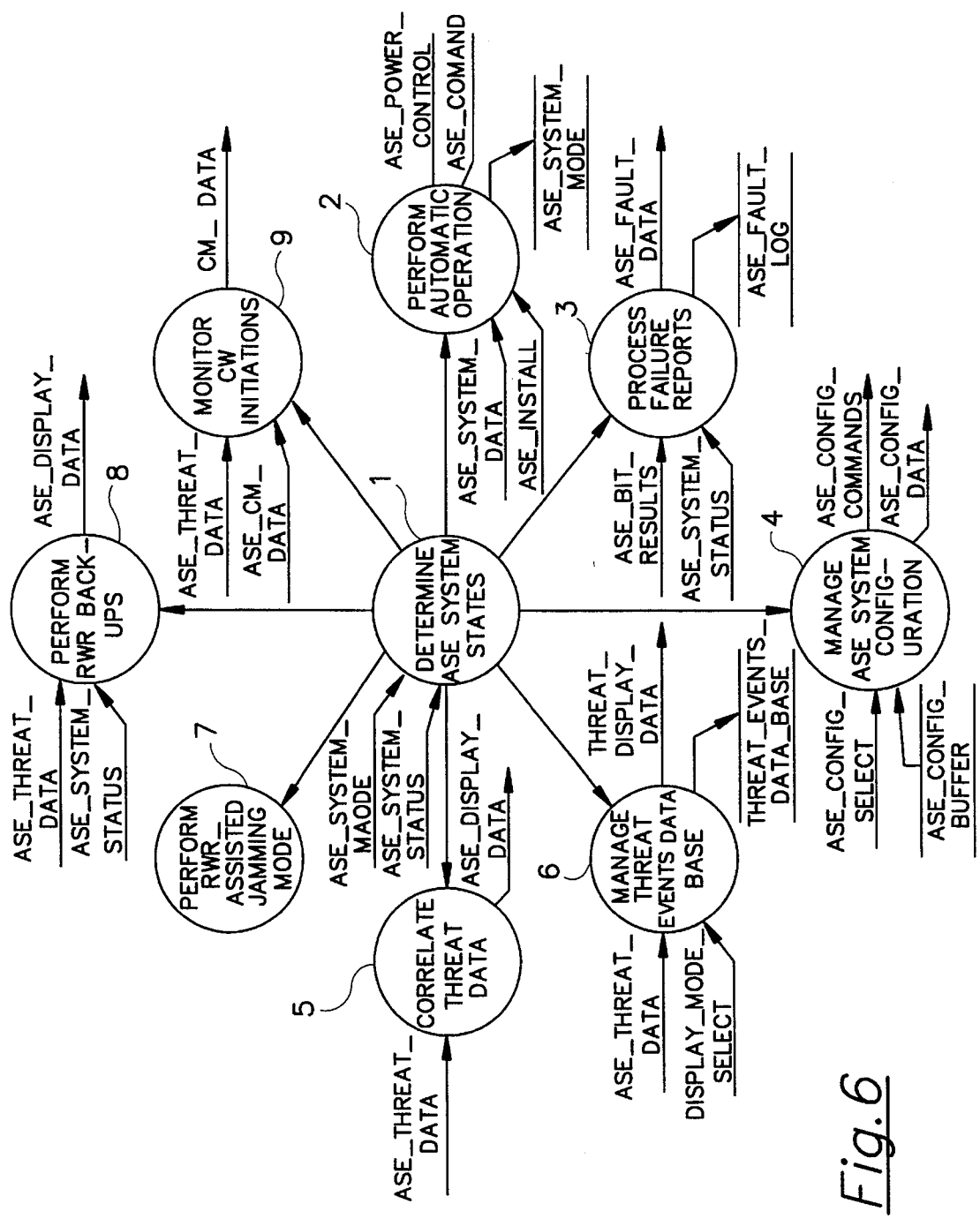
FIG. 6 shows a schematic representation of an example of an integrated ASE system.

There are nine (9) processes defined for an Integrated ASE (IASE) system as illustrated in FIG. 6.

Process 1, Determine ASE System State provides the control and coordination activities within the integrated ASE system based upon the current ASE system state. There are three main system states, "initial", "primary", and "secondary" which the system may assume. Each main state includes a finite set of sub-states. The rules used to control the transition from one system state to another are defined in terms of combinatorial logic expressions. The logic expressions are constructed from the following variable parameters: the ASE system configuration, individual subsystem mode states, and the RWR operation status. For each unique system state, specific functions associated with the data processes (i.e. Perform Automatic Operation, Manage ASE System Configuration, Correlate Threat Data, Perform RWR-Assisted Jamming Mode, Perform RWR Back-up, Monitor CM Initiations, and etc.) are performed.

Process 2, Perform Automatic Operations, consists of a set of three conventional utility functions for the integrated ASE system: Automatic Start-up, Automatic Shutdown, and Automated Built-in-Test (BIT). The method of sending commands to execute the three functions listed above are based on the availability of system interfaces. For instance, mode status for the Radar Warning Receiver and the Missile Approach Detector are set through both bus messages and hardwired discrete signals. For the case of the Pulsed and CW Radar Jammers, only hardwired signals are used to control the system mode states.

Process 3, Process Failure Reports, performs four primary functions in a conventional manner. It monitors the status of all the subsystems in the ASE suite, records the results of commanded and background BIT, maintains a record of existing faults and stored fault incidents in a history fault log. Both the current faults and history fault log date can be accessed and recalled on two dedicated display pages. This process also provides the capability to down-load fault data on to a data transfer cartridge (DTC) via the Data Transfer Systems (DTS) for playback on a ground station for review by maintenance personnel.

Process 4, Manage ASE System Configuration, allows the flight crew to store multiple ASE suite configurations in the ASE/ACS and invoke them during the course of a mission. Prior to flight, these configurations can either be entered manually into the ASE/ACS or set-up on a mission planning station and down-loaded to the ASE/ACS from the Data Transfer System over the multiplex data bus. Each ASE suite configuration mission plan contains a sequence of ASE system configurations which are accessible by manual or automatic means. Using manual control, a particular ASE system configuration can be activated by manual selection. Under automatic control, the ASE system configuration management process automatically switches system configuration from the current configuration to another configuration based upon preset times, altitude or aircraft position.

Process 5, Correlate Threat Data, performs a series of cross-sensor data correlations in order to perform critical functions. First, these correlations area used to identify unique threats detected only by the radar jammers, correlated threats detected by both the jammers and the Radar Warning Receiver. The second function is to determine the jamming status for those threats detected by the Radar Warning Receiver. In general, unique and uncorrelated threats are presented as complementary threats. The third function involves monitoring the threat information generated by the Radar Warning Receiver to detect the presence of any ambiguity. In the event an ambiguity is detected, this process attempts to resolve it using data from the jammers or others sources available. If the ambiguity is resolved, the correct symbol is displayed in place of the ambiguous symbols.

Process 6, Manage Threat Events Data Base, offers the ability to record and play back threat events encountered during a mission into the Threat Event log. Sources of providing data for threat events are the Radar Warning Receiver, Pulsed Radar Jammer, CW Radar Jammer, and Missile Approach Detector. Threat data is compressed and recorded on a temporal basis to determine threat processing status of each subsystem. Each threat event is stored as an individual record which contains threat parameters, threat derived parameters, current time, altitude and aircraft position. This process provides the capability to play back in the air and down-load the Threat Event onto a DTC for threat analysis. Additionally, threat events may be recalled by the crew in a concise presentation on the provided MFD page.

Process 7, Perform RWR Assisted Jamming Mode, establishes an interface between the Radar Warning Receiver and the CW Radar Jammer. The purpose of this link is to pass selective threat activity data from the Radar Warning Receiver to the CW Radar Jammer. Typically, each threat file transmitted by this process contains information such as the threat emitter number as assigned by the RWR, the radar emitter identification, pulsed repetition interval (PRI), angle of arrival (AOA), frequency, and etc.

Process 8, Perform RWR Back-ups, provides either a partial or full back-up to the Radar Warning Receiver depending on the extent of its failure mode. Partial RWR back-up is provided when one or more RWR receiving channels have failed while the full back-up function handles the case where the RWR has totally failed or is not installed on the aircraft. The general rule applied to the partial back-up modes is that complementary threats (i.e. uncorrelated and unique threats) are displayed and only common threats are processed prior to display to resolve any threat track file duplications. In the full RWR back-up ASE, all threats selected by the alternate RF receivers are displayed since there is no RWR data to process for threat duplications. In the full back-up mode, threats are prioritized for display by the same rules used by the RWR. In one preferred embodiment of the invention voice messages are only generated by the ASE/ACS in the full back-up mode.

Process 9, Monitor CM Initiations, provides the capability to automatically dispense chaff against an RF-guided missile. This process correlates RF activity data from the RWR and radar jammers with a region of approach data from the Missile Approach Detector. If the active RF region and the region of missile approach coincide, this process automatically commands the deployment of chaff, displays the missile threat region and generates the appropriate missile approach warning message.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method of generating a complementary threat data base for use by a state controlled aircraft survivability system, wherein the complementary threat data base is used to define the state of new threat, the method comprising the steps of:

(a) generating a unique threat data base comprised of all unique threats, wherein the unique threat data base is generated by removing all converted threat data from a data set corresponding to current threat from a continous wave radar jammer;

(b) generating an uncorrelated threat data base comprised of uncorrelated threats, wherein the uncorrelated threat data base is generated by determining all data common to currently converted jammer threat data and current threat data from a radar warning receiver; and (c) adding the data from the unique threat data base to the data from the uncorrelated threat data base to generate the complementary threat data base.

2. An integrated aircraft survivability equipment control apparatus for use with an aircraft survivability system, wherein the aircraft survivability system has a system status output, a system mode output, a threat data output, a display mode output, a configuration select output, a built-in test result output, a countermeasures data output, a system data output, and an install output, the control apparatus comprising:

(a) means for determining an aircraft survivability equipment system state having an aircraft survivability system mode input, an aircraft survivability system status input, and an aircraft survivability system state output;

(b) perform radar warning receiver back-up means having an input connected to the aircraft survivability system state output, an input connected to the aircraft survivability threat data output and an input connected to the aircraft survivability system status output, the back up means further having an aircraft survivability display data output;

(c) monitor countermeasures initiations apparatus having an input connected to the aircraft survivability equipment threat data signal and an input connected to the aircraft survivability countermeasures data signal, the countermeasures initiation apparatus further having a countermeasures data output;

(d) perform automatic operation means having an aircraft survivability system data input and an input connected to the aircraft survivability equipment installed signal, the perform automatic operations means having an output connected to the aircraft survivability equipment power control, an output connected to the aircraft survivability equipment command, and an output connected to the aircraft survivability system mode;

(e) process failure reporting means having an input connected to the aircraft survivability built-in test result output and an input connected to the aircraft survivability system status output, the process failure reporting means having an aircraft survivability fault data output and an output to the aircraft survivability fault log;

(f) manage aircraft survivability system configuration means having an input connected to the aircraft survivability equipment select and an input connected to the aircraft survivability configuration output, the manage aircraft survivability system configuration means also having an aircraft survivability configuration commands output and an aircraft survivability configuration data output;

(g) manage threat events data base means having an input connected to the aircraft survivability equipment threat data output, an input connected to the display mode select output, the manage threat events data base means having a threat display data output and a threat events data base output;

(h) correlated threat data means having an input connected to the aircraft survivability threat data output and an aircraft survivability display data output; and (I) perform radar warning receiver (RWR) assisted jamming mode apparatus or means having threat information input and an aircraft survivability tactical data output.

3. The integrated aircraft survivability control equipment apparatus of claim 2 further including a means for aircraft survivability embedded training.

4. The integrated aircraft survivability equipment control apparatus of claim 2 wherein the means for determining an aircraft survivability equipment system state further includes a communication means for communicating to other aircraft survivability equipment, satellites and ground stations.

5. The integrated aircraft survivability equipment apparatus of claim 2 wherein the countermeasures include a chaff dispenser and a decoy dispenser.

6. The integrated aircraft survivability equipment control apparatus of claim 2 wherein the aircraft survivability system includes radar warning receiver means, pulsed radar jammer means, and continuous wave radar jammer means.

7. The integrated aircraft survivability equipment control apparatus of claim 2 wherein the aircraft survivability system includes missile approach detector means.

8. The integrated aircraft survivability equipment control apparatus of claim 2 wherein the aircraft survivability system includes a multifunction display means having a multifunction display input, the multifunction display means further connected to a keyboard control unit.

9. The integrated aircraft survivability equipment control apparatus of claim 6 further comprising a means for providing a backup for the radar warning receiver means.

10. The integrated aircraft survivability equipment apparatus of claim 6 further comprising means for providing radar warning receiver assisted jamming, wherein signals received from the radar warning receiver means are provided to the continuous wave radar jammer means to enhance efficiency.

11. The integrated aircraft survivability equipment apparatus of claim 6 further comprising means for the correlation of the outputs for the radar warning receiver means, the continuous wave radar jammer means and the pulsed radar jammer means to identify detected threats.

* * * * *